(12) United States Patent
Henderson

(10) Patent No.: US 7,827,917 B1
(45) Date of Patent: Nov. 9, 2010

(54) REDUNDANT STEERING SYSTEM FOR GUIDEWAY VEHICLE

(76) Inventor: Joy Kirston Henderson, 1709 Ridgmar Blvd., Fort Worth, TX (US) 76116

( * ) Notice: Subject to any disclaimer, the term of this patent is extended or adjusted under 35 U.S.C. 154(b) by 351 days.

(21) Appl. No.: 11/958,893

(22) Filed: Dec. 18, 2007

Related U.S. Application Data

(60) Provisional application No. 60/875,499, filed on Dec. 18, 2006.

(51) Int. Cl.
 *E01B 7/00* (2006.01)
(52) U.S. Cl. .............. 104/130.07; 104/130.01; 104/140
(58) Field of Classification Search ............ 104/130.01, 104/130.07, 139, 140
See application file for complete search history.

(56) References Cited

U.S. PATENT DOCUMENTS

| | | | |
|---|---|---|---|
| 3,831,527 A | * | 8/1974 | Peterson ................ 104/130.07 |
| 3,901,160 A | * | 8/1975 | Auer, Jr. ................ 104/130.07 |
| 4,522,128 A | * | 6/1985 | Anderson ............... 104/130.07 |
| 6,357,358 B2 | * | 3/2002 | Henderson .................. 104/281 |
| 6,401,625 B1 | * | 6/2002 | Henderson .................. 104/242 |
| 6,615,740 B2 | | 9/2003 | Henderson |
| 6,742,458 B2 | * | 6/2004 | Henderson .................. 104/242 |
| 6,834,595 B1 | | 12/2004 | Henderson |
| 2007/0119332 A1 | * | 5/2007 | Henderson .................. 104/307 |

* cited by examiner

*Primary Examiner*—S. Joseph Morano
*Assistant Examiner*—Zachary Kuhfuss
(74) *Attorney, Agent, or Firm*—Bracewell & Giuliani LLP

(57) ABSTRACT

A guideway system and method of operating a guideway is included comprising a guideway with entrance and exit ramps and vehicles having both a smooth, servo-based primary steering systems based upon proximity sensing of the side of the guideway and a backup mechanical steering system. The backup steering system is selectively engaged and disengaged based on location with respect to the entrance and exit ramps and provides vehicle wheel steering in the event of a failure of the primary servo steering system. The backup steering comprises one or more vertical members affixed to the guideway and one or more steering elements engageable with the member(s). The elements may be pivoted into and out of backup steering engagement.

17 Claims, 6 Drawing Sheets

REDUNDANT STEERING SYSTEM FOR GUIDEWAY VEHICLE

CROSS-REFERENCE TO RELATED APPLICATION

This application claims priority to provisional application Ser. No. 60/875,499, filed Dec. 18, 2006.

FIELD OF THE INVENTION

The present disclosure relates in general to guided vehicles and more specifically relates to a redundant manner of steering the guided vehicle. The disclosure also relates to vehicles, trains or trams containing multiple vehicles coupled together that are operable either only on elevated guideways or on both conventional roadways and on elevated guideways.

BACKGROUND OF THE INVENTION

Several previous vehicles operated on fixed guideways that do not use flanged railroad-style wheels have employed some sort of steering rails mounted at each side of the guideway. These vehicles have generally employed sets of rollers at each side that were selectively engaged with the steering rails to rotate in contact with the rails as a purely mechanical means of steering the vehicle. Because in such cases the steering rollers were required to be in constant contact with the steering rails, the vehicle speeds had to be limited to allow bearings of the steering rollers to turn at speeds that would enable acceptable bearing life. In addition, the purely mechanical nature of the vehicle steering generally made it necessary to provide some dead zone between sets of steering rollers that caused the vehicles to sometimes tended to lack the desired degree of smoothness, sometimes causing some discomfort to vehicle passengers.

In order to overcome the above problem, non-contact steering rail proximity sensors may be used that generate continuous electrical error signals that feed to vehicle steering controllers that drive steering servos to smoothly steer the vehicle to maintain each sensor a fixed distance from the reference steering rail. This approach provides enables each end of the vehicle to be smoothly steered to maintain the vehicle ends at a fixed distance from the side of the guideway. By selecting outputs from sensors at either the right or left side of the vehicle, the vehicle is caused to follow reference rails at either side of the vehicle. In this manner, the vehicle may be caused to steer from a main guideway to a side guideway or alternatively, from a side guideway to a main guideway. Selection of left or right side steering reference sensors can be accomplished either by an operator on board the vehicle or by an automatic vehicle control system.

However, vehicles operating on fixed guideways and steering automatically based upon sensing proximity to fixed steering reference rails of the guideway need a positive backup mechanical means for steering in the event that reference rail position sensing or automatic steering controls fail. Without such backup steering means, several adverse consequences can occur in the event of automatic steering failures. Steering failure can result in the vehicle crashing sideways into guideway components such as electric power supply rails located at the sides of the guideway and thereby causing damage to the guideway and vehicle. Steering failure can result in the vehicle running off of the guideway with potential for serious and even fatal consequences for vehicle passengers. In cases wherein the vehicle must follow either the left or right side steering rail during switching at switch "Y" points between guideways, absence of such backup mechanical steering means engaged on the same side as the steering reference rail could cause the vehicle to lose control and cause a serious crash. Such an event would be similar to that of a conventional railroad train attempting to pass through an open switch.

SUMMARY OF THE INVENTION

The transport system disclosed herein includes a guideway having a railtube, a power conductor rail disposed within the railtube, a reference rail affixed to the railtube having a base portion with a first web member extending at a right angle from the base portion. A vehicle is disposable on the guideway having front and rear wheels configured for travel within the railtube. A steering servo is included for providing steering operation steeringly coupled to a wheel. A sensor is mounted to the vehicle configured to sense distance from the sensor to the railtube and a backup steering device is selectively positionable into backup steering engagement with the reference rail.

The backup steering device comprises an inner member configured for backup steering engagement with an inner side of the first web member and an outer member configured for backup steering engagement with an outer side of the first web member. The outer member is mechanically coupled to an actuator for selective positioning into and out of backup steering engagement. In one embodiment, the steering device comprises an actuator member and roller arm, wherein the actuator member is connected on one end to the actuator and pivotally connected on another end to the roller arm and the outer member is on a free end of the roller arm. Lateral displacement of the actuator arm by the actuator pivotingly and selectively moves the outer member into and out of position for backup steering engagement. An optional embodiment of the reference rail comprises a second web member extending at an angle from the base portion and defining a space between the first and second web member. A processor may be included configured to receive signals from a vehicle control system and control operation of the backup steering device.

In the preferred embodiment, the only use for the steering sensor is to supply steering error signals to the primary steering system servo controller. The steering sensor is not involved in any manner with commanding engagement or disengagement of the backup steering device. The selection of right or left hand steering sensors and right or left hand backup steering devices is made either by an on-board vehicle control system that is operated either automatically or on the basis of manual inputs from an on-board operator.

The backup mechanical steering device would be useful for vehicles operating with wheels or other suspension techniques, including magnetic levitation and air levitation either inside enclosed or open rails. In either case, the steering reference rail for the backup steering device is mounted at each side of the guideway. This steering reference rail may also be used as the steering reference for proximity sensing for the automated electromechanical steering system.

A method of operating a transport system is also disclosed herein, wherein the transport system comprises a guideway having a railtube, a vehicle having wheels disposed within the railtube, a web member in the railtube, and a backup steering device configured for selective engagement and disengagement with the web. The method comprises (a) sensing wheel position within the railtube by a proximity sensor relative to the selected, (b) smoothly steering the wheels within the railtube based on the step of sensing, (c) selectively engaging the backup steering device with the web, and (d) selectively disengaging the backup steering device from the web. The guideway comprises a primary guideway and a branch portion, wherein the guideway is configured for ingress and/or egress to and from the primary guideway to the branch portion.

DETAILED DESCRIPTION OF THE INVENTION

Figure 1:
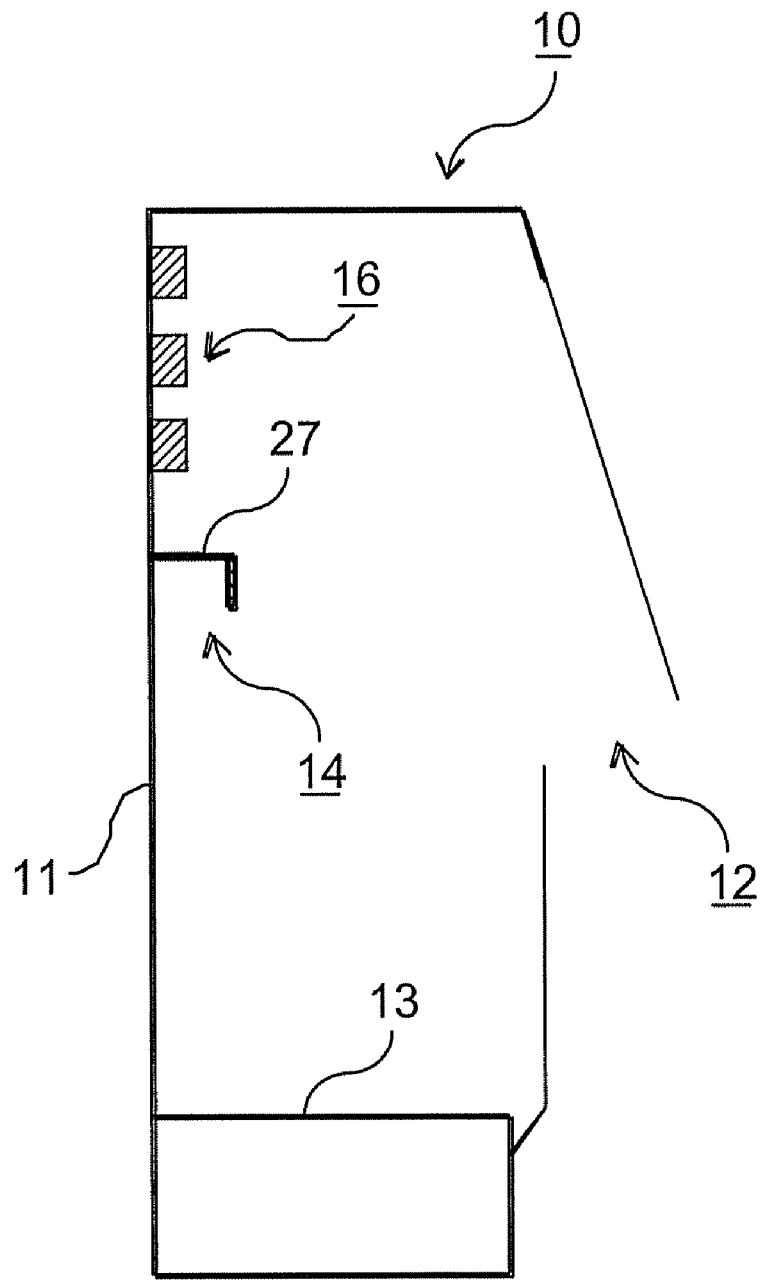
FIG. 1 is a side cross sectional view of a tramway system railway.

With reference now to FIG. 1, one embodiment of a rail tube 10 is shown in a side cross sectional view. As noted above, a rail tube makes up a portion of a guideway used in directing individual either guideway-captive or dualmode vehicles or vehicles associated with a guideway-captive train or dualmode tram systems. The rail tube 10 comprises an outer housing 11 through which associated wheels (not shown) of a vehicle are guided when traveling along the associated guideway. A base 13 is shown on the lower end of the housing 11 and configured for supporting the vehicle wheels/tires. The vehicle may be self powered or motivated by electrical power from power supply rails 16 running along the inside of the housing 11. A steering reference rail 14 is shown affixed to a portion of the inside of the housing 11. In this embodiment, the steering reference rail 14 comprises a base portion 27 aligned substantially perpendicular to a sidewall of the housing 11 and a vertical web member 15 downward extending from the terminal free end of the base portion 27. An axle slot 12 is formed on the inner portion of the housing 11 to allow for an axle associated with a vehicle to longitudinally pass along the guideway.

Figure 2:
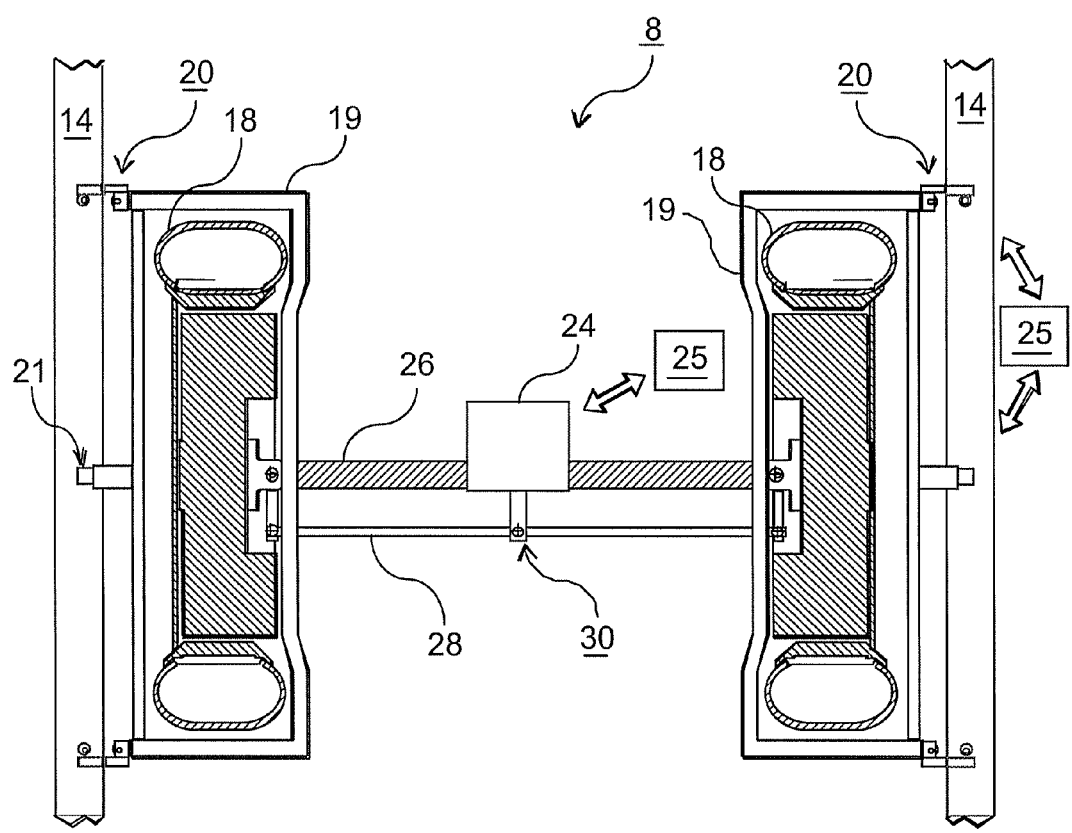
FIG. 2 is an overhead view of a tramway steering system that includes a backup steering system.

FIG. 2 provides an overhead view of a steering system 8 in accordance with the present disclosure. In this embodiment, the steering system 8 comprises a steering system comprised of a steering servo actuator 24, an associated processor 25, an axle 26, a servo/tie-rod connection 30, a tie-rod 28, a sensor 21, supplying continuous steering error information to processor 25 and a backup steering device 20. A support bracket 19 is shown affixed at its center to the wheel steering clevis 22 and laterally circumscribing the outer periphery of a tire 18. In primary steering operation, the steering servo actuator 24 responds to commands from the processor for steering the tire 18 through the associated guideway. The processor 25 is shown in a schematical box view but may comprise any type of processor, microprocessor including an information processing device.

Tires 18, are rotatingly and pivotingly attached to the axle 26 and steered by laterally moving the tie-rod 28 in either a left or a right position by the steering servo actuator 24 and the servo/tie-rod connection 30. Steering or directing the tires 18 with the steering servo actuator 24 may be performed in accordance with continuous steering error data obtained from the steering sensor 21. The steering sensor 21 is situated proximate to the outer wall of the housing 11. Accordingly, the combination of the sensor 21 and the processor 25 may sense when the tires 18 (and thus the associated vehicle) is either too far or too close to one side of the rail tube 10 and thus the guideway. Based on this sensed value, the tires 18 may be adjusted to be substantially centered within the individual rail tubes 10. Optionally the tires 18 may be steered/directed to positions within the individual rail tubes 10 that is not substantially at its center. These positions may be identified and programmed within the processor thereby directing vehicle traffic in this manner.

Figure 3:
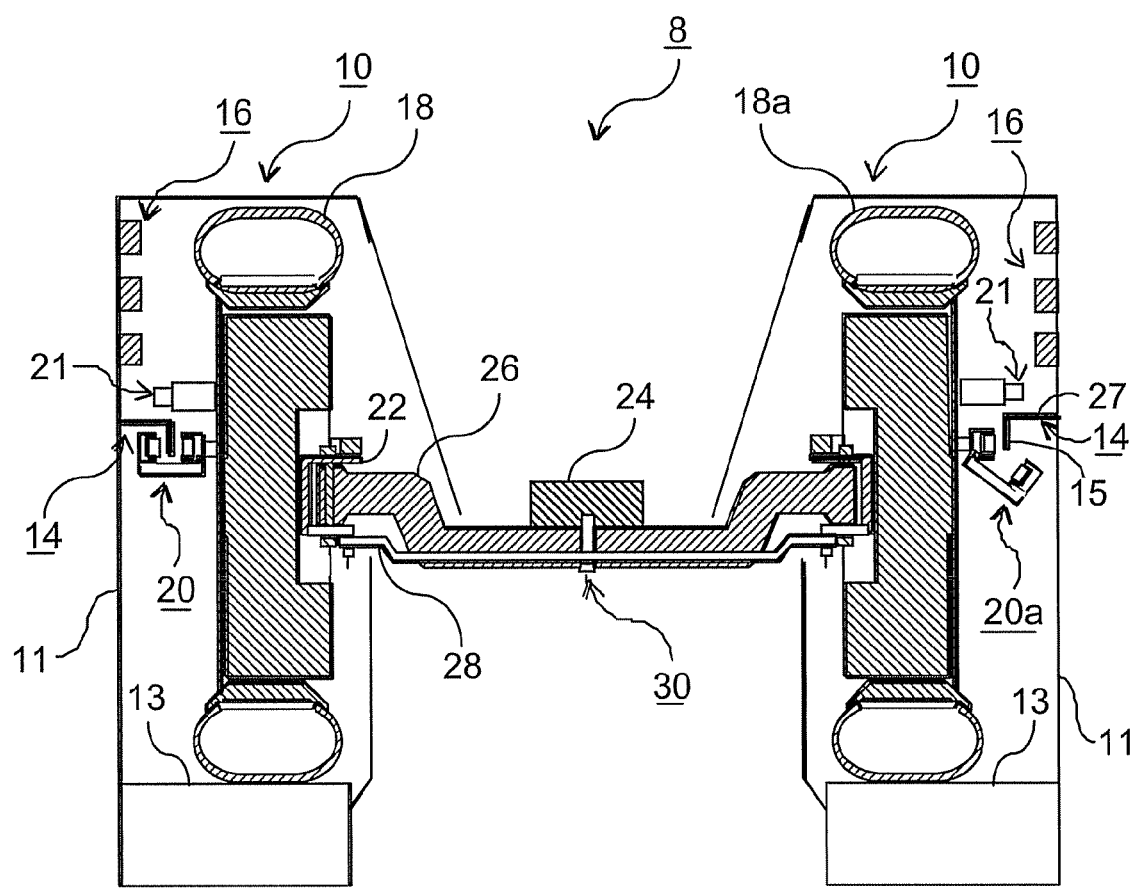
FIG. 3 is a longitudinal view of a tramway steering system having a backup steering system.

FIG. 3 provides a longitudinal view of an embodiment of a steering system 8. In this figure, the steering system 8 with associated with tires 18 is illustrated longitudinally disposed within respective rail tubes 10. Also shown are engaged and disengaged embodiments of the back up steering system 20. Backup steering system 20 is in a backup steering or engaged position, this system 20 is in engaging alignment with both the inner portion and outer portion of the vertical member 15. A disengaged embodiment of the backup steering system 20a is shown wherein a portion of the steering system is pivotingly disposed at an angle and not engageable with the vertical member 15. In the disengaged embodiment, the associated tire 18a would be allowed to move away from the steering reference rail 14.

Positioning the backup steering system 20 with vertical rail 15 provides redundant steering of a vehicle within a guideway should the primary steering system be inoperable or the sensor 21 be unable to maintain a desired alignment of the tires 18 within the housing 11 of the rail tube 10. The engaged backup steering system 20 will maintain the vehicle within a relatively small range of lateral movement as it travels through the guideway. Moreover, the backup steering system 20 is selectively open or closed into either backup steering engagement or out of steering engagement. Then, when desired to disengage from the reference steering rail 14, a disengaged configuration, as illustrated by reference number 20a, may be assumed.

Figure 4:
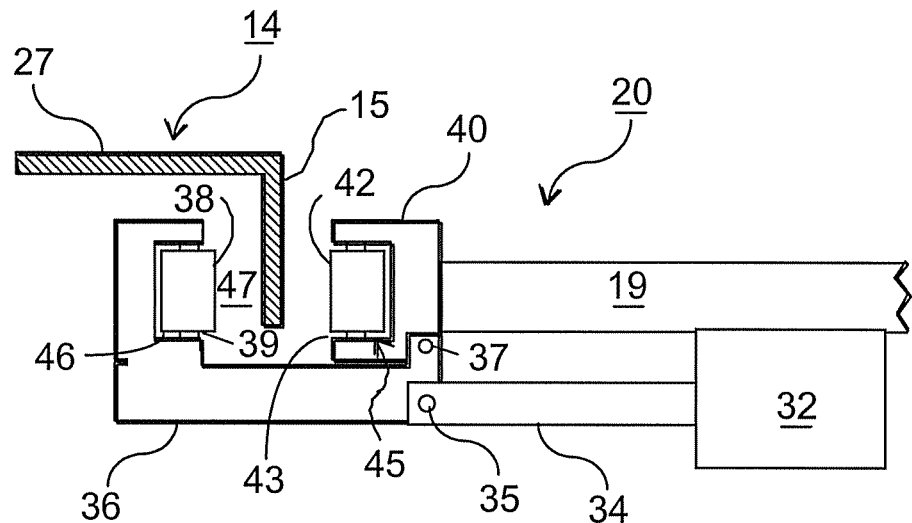
FIG. 4 is a side view of an embodiment of a backup steering system for a tramway steering system in an engaged position.

FIG. 4 illustrates a side view of an embodiment of the backup steering device for engaging the reference rail 14. The backup steering device 20 comprises a roller bracket 40 attached to the support bracket 19, and a roller arm 36 pivotingly attached to a portion of the roller bracket 40 and held in pivoting relationship with a pivot pin 37. The roller bracket 40 includes a recess 45 formed to receive a steering roller 42 comprised of hard steel or a hard composite material such as polyurethane rotatingly affixed within the recess 45 on a spindle pin 43. A roller arm 36 of the embodiment of FIG. 4 comprises a generally L-shaped member having its elongate section pivotally attached to the roller bracket 40. The perpendicular shorter portion of the roller arm 36 is shown substantially parallel to the roller bracket 40. A corresponding recess 46 is formed in the shorter portion of the roller arm 36 and formed to receive a similarly corresponding steering roller 38 therein. A spindle pin 39 is secured with the recess 46 to provide a rolling base on which the steering roller 38 rotates. Disposing the steering rollers (38, 42) laterally apart from one another forms a space 47 between these two rollers. Optionally, simple, non-rotating pads made from a dense low-friction composite material such as UHMW may be used instead of the steering rollers. Aligning the backup steering device 20 such that the vertical web 15 extends into the space 47 structurally limits the lateral travel of an associated vehicle. For example, the lateral displacement of the vehicle in either a left or right direction is limited by the distance between the outer circumference of either roller (38, 42) and the outer surface of the corresponding side of the vertical web 15.

Figure 5:
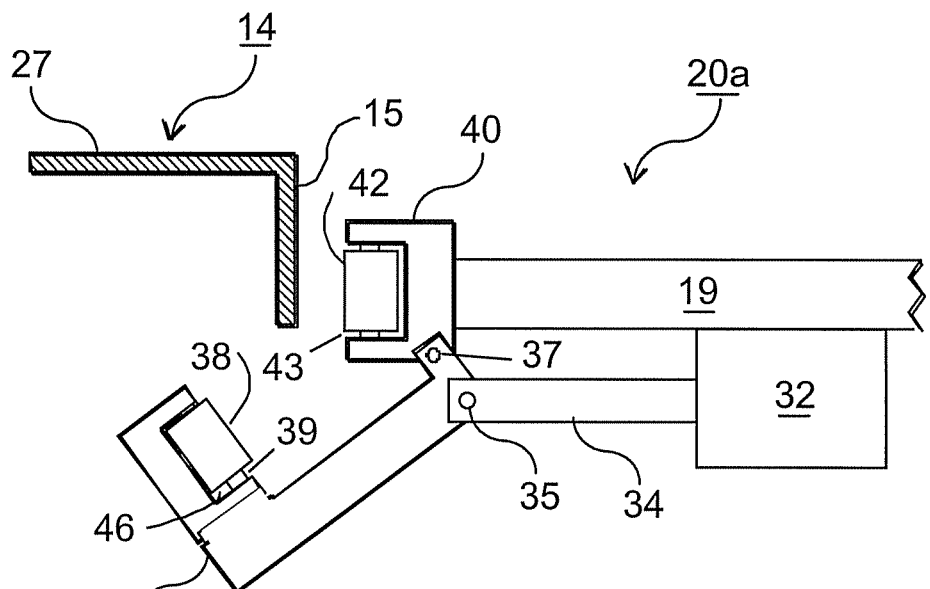
FIG. 5 is a side view of the embodiment of a backup steering system for a tramway steering system of FIG. 4 in a disengaged position.

FIG. 5 illustrates an alternative configuration of the backup steering device 20a wherein the steering device is shown in a disengaged position. Here, the roller arm 36 is in a pivoted open position where an actuation of the roller arm 36 pivoting is accomplished by an actuator 32 with an associated actuator arm 34. The actuator arm 34 is connected to the roller arm 36 via a pivot pin 35 wherein lateral movement of the actuator arm 34 can selectively upwardly or alternatively downwardly pivot the roller arm 36 thereby selectively moving the backup steering device into and out of backup steering engagement with the vertical web 15. Operation or control of the actuator 32 may be performed manually or by virtue of controller process software stored within the either processor 25 or another processor based upon signals from a vehicle control system.

Figure 6:
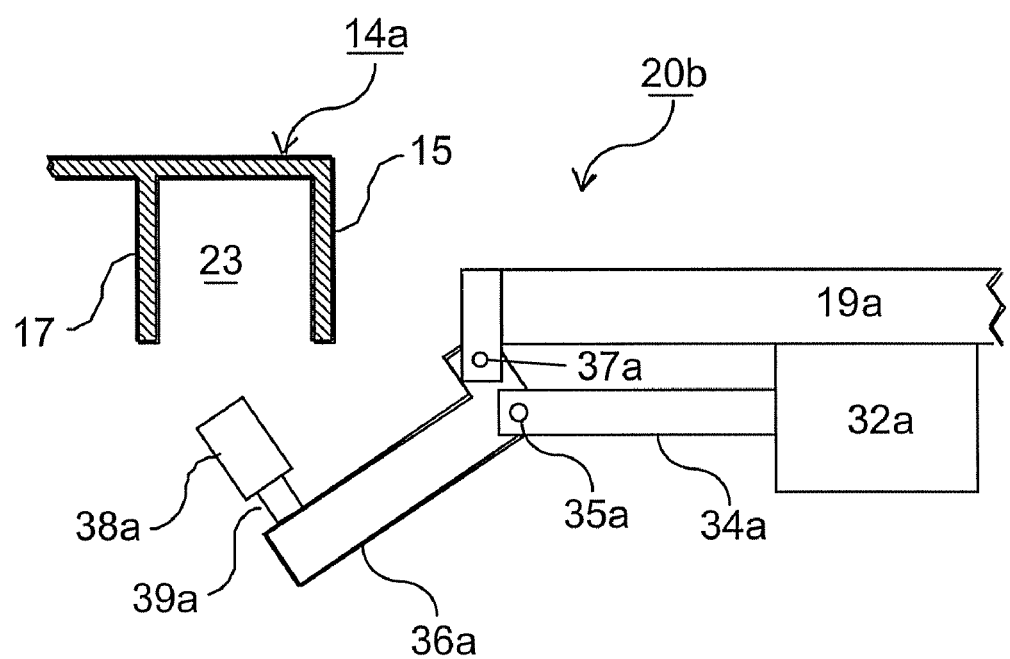
FIG. 6 is a side view of an optional embodiment of a backup steering system for a tramway steering system in a disengaged position.

One alternative optional embodiment of a backup steering device 20b is provided in side view in FIG. 6. This embodiment comprises a roller arm 36a pivotingly connected to a support bracket 19a having a pivot pin 37a providing a pivoting joint between the roller arm 36a and the support bracket 19a. The roller arm 36a has a generally L-shaped profile where the terminal edge of the reduced length portion is pivotingly coupled to the support bracket 19a and the elongate portion extending outward having a steering roller 38a affixed thereto and extending in a generally parallel direction with the reduced length end. The steering roller 38a is rotatingly affixed on a spindle pin 39a that is attached into the roller arm 36a. Selective upward and downward pivoting of the roller arm 36a with its corresponding steering roller 38a is accomplished by actuation from an actuator 32a having an actuator arm 34a connected to the apex portion of the base 36a. A pivot pin 35a extends therethrough and connects the actuator arm 34a to the roller arm 36a. Reciprocating and selective lateral actuation of the actuator arm 34a pivots the roller arm 36a into and out of selective engagement with the steering reference rail 14a. In this embodiment, the steering reference rail 14a includes a first and second vertical web (15, 17) and forming a space 23 between the webs (15, 17).

Figure 7:
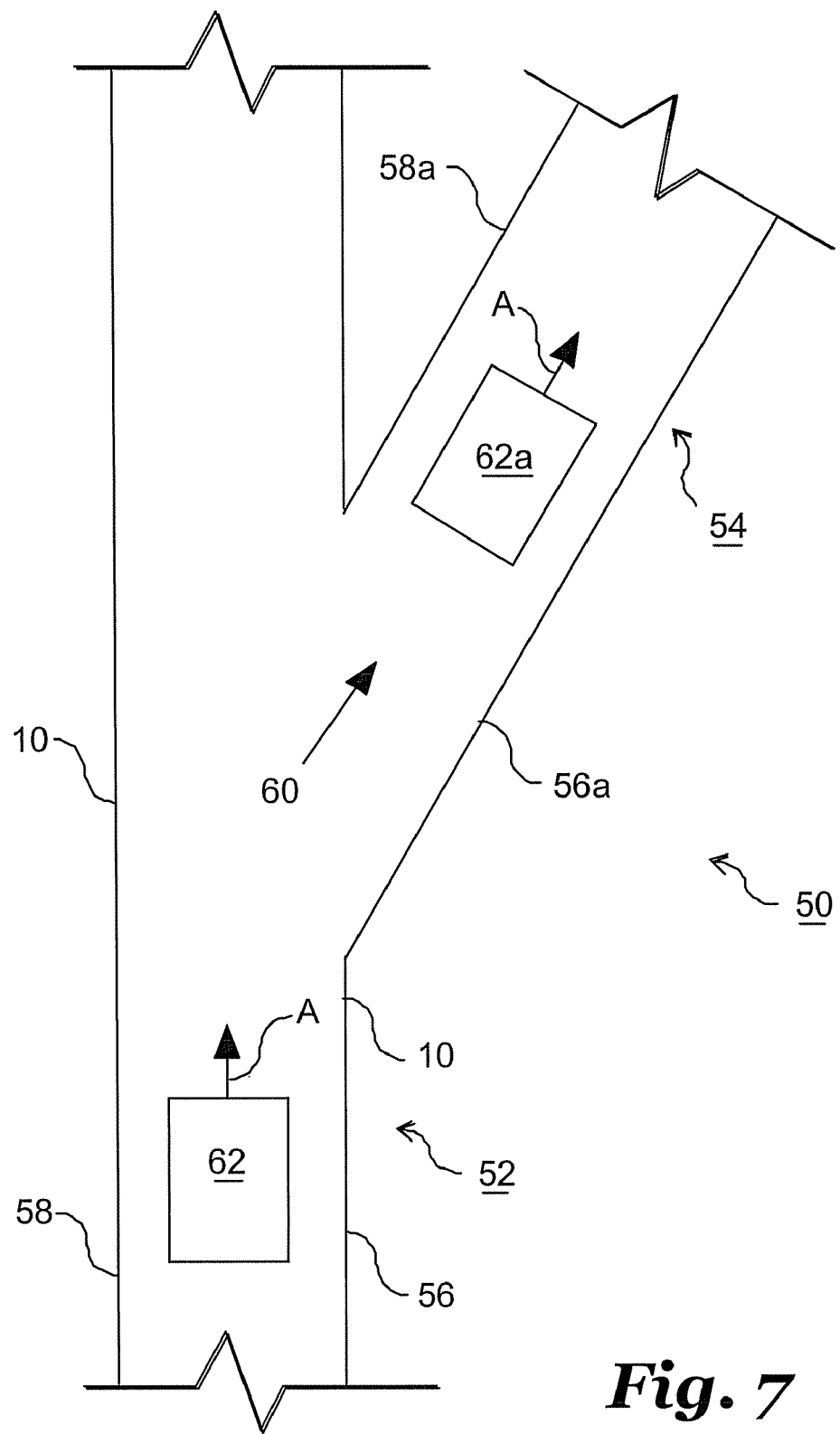
FIG. 7 is a schematic plan view of a guideway having a branch.

An overhead schematical view of one example of a guideway system 50 is provided in FIG. 7. The guideway system 50 comprises a primary guideway 52 which is a generally laterally extending section and comprising lateral rail tubes (56, 58) forming left and right terminal edges of the guideway system 50. A branch guideway 54 is shown extending from the primary guideway 52 at an oblique angle from the primary guideway 52. In this embodiment the branch guideway 54, formed at a "Y" section 60 may comprise either an entrance or an exit ramp to or from the primary guideway 52.

In typical operation, the backup steering system described herein may be in the selectively engaged position to ensure relatively stable steering of the vehicle 62 within the guideway in the event of a failure of the primary steering system during transit through the "Y" switch section 60. However, when a vehicle 62 is approaching a branch guideway 54 and it is desired that the vehicle 62 be redirected from the primary guideway 52 to the branch guideway 54, the backup steering systems on both lateral sides of the vehicle 62 may be selectively engaged and disengaged thereby allowing free movement of the tram to the branch guideway 54 while maintaining the backup steering system of the vehicle engaged on the side of the guideway on which rails 56 and 56a are continuous through the "y" switch.

It is desired to selectively maintain engagement of the backup steering system on the side of the vehicle 62 where the associated rail tube is continuous. For example, with reference to the schematic of FIG. 7, a vehicle 62 is sequentially illustrated traveling along the primary guideway 52 and exiting onto the branch guideway 54. The direction of the vehicle 62 is illustrated by the associated arrows A. In this embodiment, it is desired that the backup steering device maintain engagement with the vertical web on the side of the vehicle 62 wherein the rail tube is continuous throughout the exit. In the example of FIG. 7 the continuous rail tube would be the lateral rail tube 56. However, to exit from the primary guideway 52 to the branch guideway 54, the vehicle 62 will need to separate from the lateral rail tube 58; which requires disengagement of the backup steering device coupling the vehicle 62 with the lateral rail tube 58. Once on the branch guideway 54, the vehicle 62 may then selectively re-engage the branch guideway rail tubes (58a, 56a) with the backup steering device.

In one optional embodiment, the backup steering device may comprise laterally spaced apart engaging members that do not pivot with respect to one another but may be wholly raised in and out of engagement with a corresponding vertical web member. In this embodiment a base member would have vertically extending members for side engagement with an associated vertical web and a corresponding space is formed between the two vertical members.

The invention has significant advantages. The vehicle, whether a dualmode vehicle, or multi-vehicle captive trains, or multi-vehicle dualmode trams, may operate on a guideway either with or without a driver while being powered and controlled by the guideway system. While on the guideway, power is supplied by the guideway and smooth, primary steering is accomplished by steering servos steering coupled to the wheels upon the basis of continuous error signals from proximity steering sensors that are located adjacent steering rails mounted to the guideway with backup mechanical steering that maintains relatively stable steering in the event of failure of the primary steering system. Additionally, the backup steering system provides mechanical steering backup for the wheels during transitions of the cars to and from main guideways to branch guideways at "Y" switch points that assure correct steering of the wheels in the event of failure of the primary steering system.

While the invention has been shown in only one of its forms, it should be apparent to those skilled in the art that it is not so limited but is susceptible to various changes without departing from the scope of the invention.

I claim:

1. A transport system, comprising:
    a guideway having a railtube;
    a power conductor rail disposed within the railtube;
    a reference rail affixed to the railtube having a base portion with a first web member extending at an angle from the base portion;
    a vehicle having front and rear wheels configured for travel within the railtube;
    a primary steering servo steeringly coupled to a wheel;
    a primary steering reference sensor mounted to the vehicle configured to continuously sense distance from the sensor to a side of the railtube and provide continuous and smooth steering error signals to the primary steering servo; and
    a mechanical backup steering device steeringly coupled to a wheel and being selectively positionable into backup steering engagement with the reference rail.

2. The system according to claim 1, wherein the backup steering device comprises an inner member configured for backup steering engagement with an inner side of the first web member and an outer member configured for backup steering engagement with an outer side of the first web member.

3. The system according to claim 2, wherein the outer member is mechanically coupled to an actuator for selective positioning into and out of backup steering engagement.

4. The system according to claim 3 further comprising an actuator member and roller arm, wherein the actuator member is connected on one end to the actuator and pivotally connected on another end to the roller arm and the outer member is on a free end of the roller arm, wherein lateral displacement of the actuator arm by the actuator pivotingly and selectively moves the outer member into and out of position for backup steering engagement.

5. The system according to claim 1, further comprising a second web member extending at an angle from the base portion and defining a space between the first and second web member.

6. The system according to claim 5, wherein the backup steering system comprises an engagement member selectively and pivotingly disposable into the space for backup steering positioning.

7. The system according to claim 1, further comprising a processor configured to receive a signal from a vehicle control system and control operation of the backup steering device.

8. The system according to claim 7, further comprising:
a second reference rail affixed to a second railtube on an opposite side of the guideway from said first mentioned railtube;
a mechanical second backup steering device steeringly coupled to a wheel on an opposite side of the vehicle from said first mentioned wheel; wherein
the processor is further configured to disengage the first mentioned backup steering device from the reference rail on the first mentioned railtube and engage the second backup steering device with the second reference rail.

9. A transport system, comprising:
a guideway having spaced-apart parallel railtubes;
a reference rail affixed to each of the railtubes;
a vehicle having two front and two rear wheels, each configured for travel within one of the railtubes;
a primary steering servo steeringly coupled to one of the wheels on each side of the vehicle;
a primary steering reference sensor mounted to each side of the vehicle configured to continuously sense distance from the sensor to the reference rail to provide continuous and smooth steering error signals to the primary steering servo;
a mechanical backup steering device steeringly coupled one of the wheels on each side of vehicle, each of the steering devices being movable from a backup steering position adjacent one of the reference rails to a storage position, each of the backup steering devices being capable of mechanically steering the vehicle by engagement with one of the reference rails in the event one of the primary steering servos or one of the primary steering reference sensors fail; and
a controller that maintains one of the backup steering devices in the backup steering position and another one in the storage position while the vehicle is being steered with one of the primary steering reference sensors and primary steering servos.

10. The system according to claim 9, wherein the backup steering device on a left side of the vehicle is in the backup steering position when the primary steering sensor on the left side of the vehicle is functioning.

11. A method of operating a transport system, wherein the transport system comprises a guideway having a railtube, a vehicle having wheels disposed within the railtube, a web member in the railtube, and a backup steering device configured for selective engagement and disengagement with the web member, the method comprising:
(a) continuously sensing wheel position within the railtube;
(b) continuously and smoothly steering the wheels within the railtube based on the step of sensing;
(c) selectively engaging the backup steering device with the web member;
(d) selectively disengaging the backup steering device from the web member; and
wherein the web member comprises a first and second vertical element having a space therebetween and wherein the backup steering device comprises a steering member selectively disposable into the space for backup steering engagement.

12. The method of claim 11 further comprising sensing a location within the railtube and performing one of step (c) or step (d) based on commands from a vehicle control system.

13. The method of claim 11 wherein the guideway comprises a primary guideway and a branch portion, wherein the guideway is configured for ingress and/or egress to and from the primary guideway to the branch portion.

14. The method of claim 13 wherein the step of selectively disengaging the backup steering device from the web is performed proximate to the branch portion of the guideway.

15. The method of claim 11, wherein the backup steering device comprises an inner and outer steering member.

16. The method of claim 15, wherein the outer steering member is pivotally affixed to the inner steering member and pivoting the outer steering member with respect to the inner steering member disposes the backup steering device into a steering configuration.

17. The method of claim 15, wherein the inner and outer steering members are rigidly affixed to one another and are jointly disposable into steering engagement with the vertical member.

\* \* \* \* \*